United States Patent [19]

Chou

[11] Patent Number: 5,588,336

[45] Date of Patent: Dec. 31, 1996

[54] HANDLEBAR STEM COUPLING MODULE FOR A BICYCLE

[76] Inventor: Chen-chang Chou, No. 9, Chingchuan Rd., Taya Hsiang, Taichung Hsien, Taiwan

[21] Appl. No.: 543,304

[22] Filed: Oct. 16, 1995

[51] Int. Cl.⁶ ................................. B62K 21/18
[52] U.S. Cl. .................. 74/551.1; 403/383; 403/344; 280/279
[58] Field of Search .................. 74/551.1, 551.3, 74/551.6; 280/279, 280; 403/383, 344

[56] References Cited

U.S. PATENT DOCUMENTS

| | | | |
|---|---|---|---|
| 3,722,930 | 3/1973 | Humlong | 74/551.6 X |
| 3,922,883 | 12/1975 | Bevacqua | 403/383 X |
| 4,632,195 | 12/1986 | Emmerich | 403/383 X |
| 4,753,462 | 6/1988 | Liu | 403/344 X |
| 5,095,770 | 3/1992 | Rader, III | 74/551.3 X |
| 5,201,242 | 4/1993 | Chi | 74/551.1 |
| 5,293,921 | 3/1994 | Marocco | 403/383 X |
| 5,356,237 | 10/1994 | Sung | 74/55.1 X |
| 5,387,255 | 2/1995 | Chiang | 74/551.1 |

FOREIGN PATENT DOCUMENTS 2653582  10/1977  Germany ........................ 280/280

*Primary Examiner*—Vinh T. Luong
*Assistant Examiner*—Mary Ann Battista
*Attorney, Agent, or Firm*—Hedman, Gibson & Costigan, P.C.

[57] ABSTRACT

A handlebar stem coupling module for a bicycle which includes a steerer tube, and a handlebar stem having a compression connector formed on one distal end thereof. The handlebar stem coupling module includes an urging sleeve securely mounted between an outer wall of the steerer tube and an inner wall of the compression connector, and an elongated slit laterally defined in the urging sleeve and extending along a length thereof.

2 Claims, 4 Drawing Sheets

HANDLEBAR STEM COUPLING MODULE FOR A BICYCLE

FIELD OF INVENTION

The present invention relates to a handlebar stem coupling module, and more particularly to a handlebar stem coupling module for a bicycle and the like.

RELATED PRIOR ART

A conventional engagement between a handlebar stem and a steerer tube for a bicycle and the like is shown in FIG. 5. However, by such an arrangement, there still remain some shortcomings therein.

There will be a complete illustration in the detailed description of the preferred embodiments, concerning the conventional engagement of the bicycle.

The present invention has arisen to mitigate and/or obviate disadvantages of the conventional engagement of the bicycle.

SUMMARY OF THE INVENTION

The primary objective of the present invention is to provide a coupling module for securely engaging a handlebar stem and a steerer tube of wheeled vehicles.

In accordance with one aspect of the present invention, there is provided a handlebar stem coupling module for a bicycle which includes a steerer tube, and a handlebar stem having a compression connector formed on one distal end thereof and mounted around an outer wall of the steerer tube. The handlebar stem coupling module includes an urging sleeve securely mounted between the outer wall of the steerer tube and an inner wall of the compression connector, and an elongated slit laterally defined in the urging sleeve and extending along a length thereof.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 5:
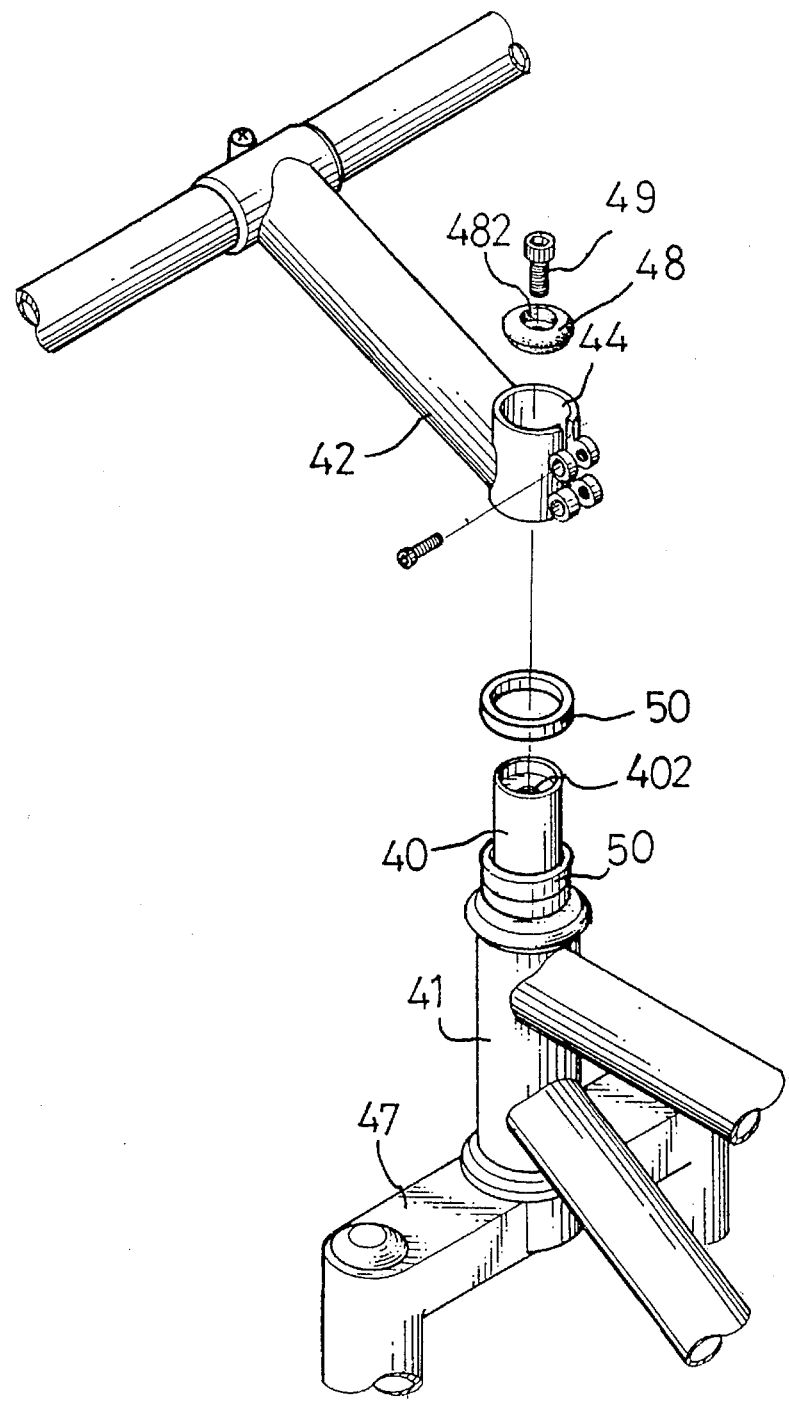
FIG. 5 is a perspective exploded view showing a conventional engagement between a handlebar stem and a steerer tube of a bicycle in accordance with the prior art.

For a better understanding of features and benefits of the present invention, reference is made to FIG. 5, illustrating a conventional engagement between a handlebar stem and a steerer tube of a bicycle in accordance with the prior art. The bicycle comprises a steerer tube 40 rotatably mounted in a head tube 41 and having a lower end fixedly attached to a fork crown 47, and a handlebar stem 42 having a compression connector 44 formed on one distal end thereof and securely mounted around an outer wall of the steerer tube 40.

A plurality of washers 50 are mounted around the steerer tube 40 and are securely urged between the compression connector 44 and the head tube 40. A cap 48 is mounted on an upper portion of the steerer tube 40 and compression connector 44. A positioning bolt 49 extends through a counterbore 482 defined in the cap 48 and is threadedly engaged in a threaded hole 402 defined in the steerer tube 40, thereby retaining the compression connector 44 together with the steerer tube 10 in position.

However, by such an arrangement, on adjustment of the level of the handlebar stem 42, the compression connector 44 has to be removed from the steerer tube 40 with the positioning bolt 49 being unscrewed such that the washers 50 can be added to or removed from the steerer tube 40, thereby adjusting the height of the handlebar stem 42. Therefore, it is inconvenient and difficult to adjust the height of the handlebar stem 42.

Figure 1:
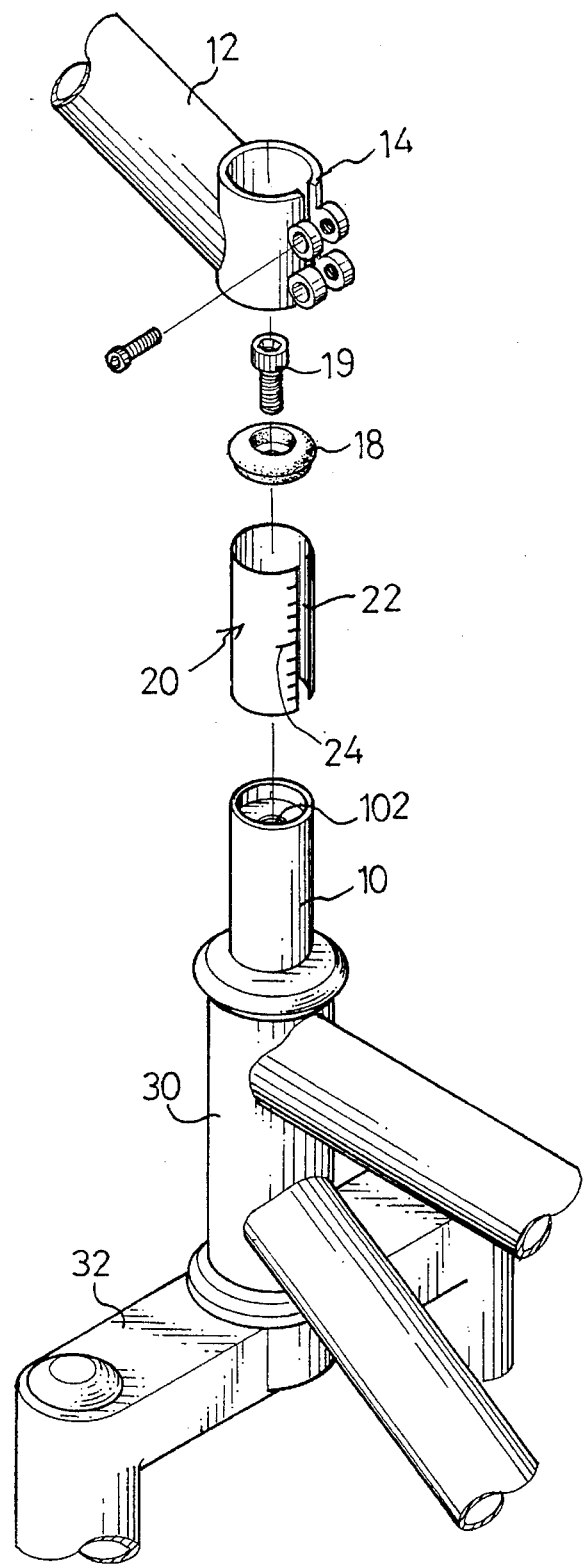
FIG. 1 is a perspective exploded view showing a coupling module in accordance with a first embodiment of the present invention.
Figure 2:
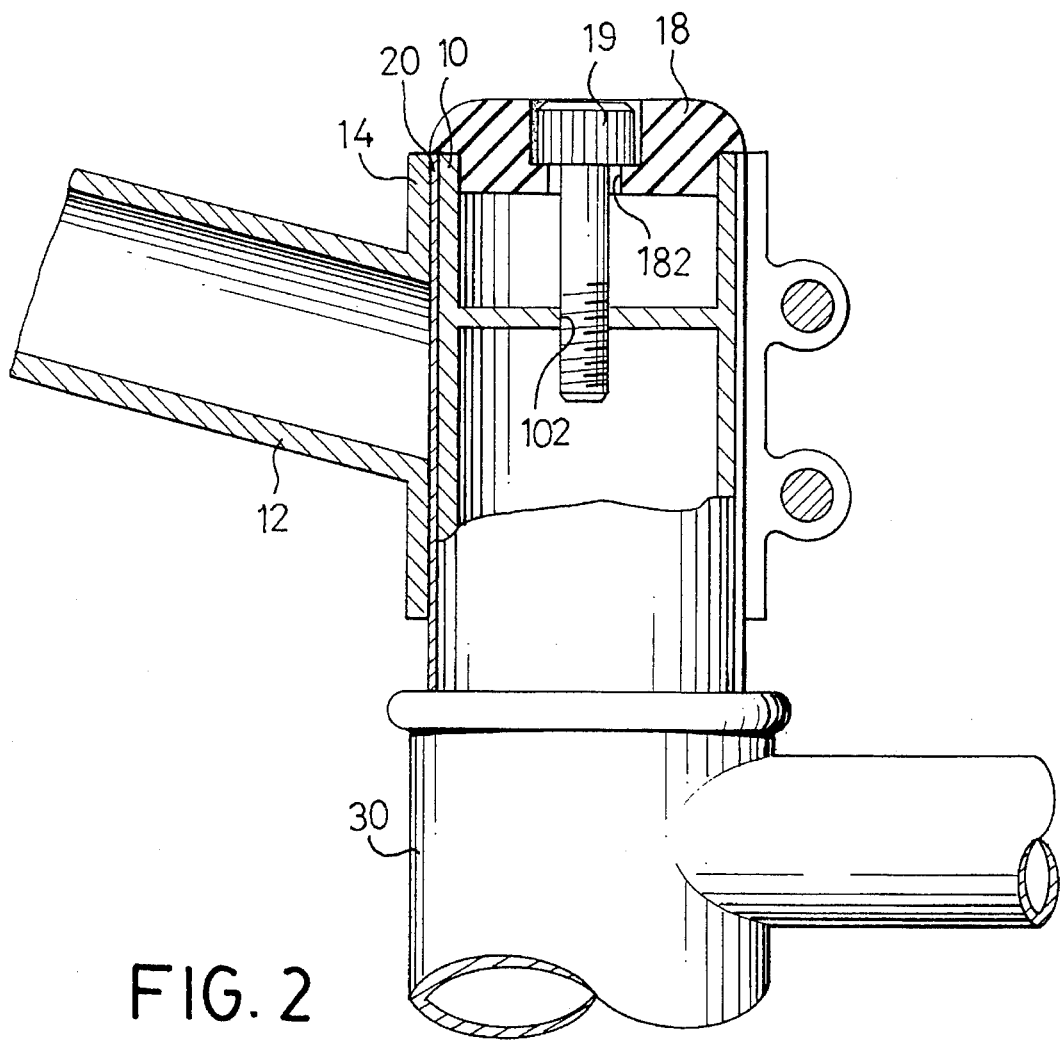
FIG. 2 is a front plan cross-sectional view of FIG. 1.

Referring to FIGS. 1-4, and initially to FIGS. 1 and 2, a handlebar stem coupling module in accordance with a first embodiment of the present invention is provided for a bicycle which comprises a steerer tube 10 rotatably mounted in a head tube 30 and having a lower end fixedly attached to a fork crown 32, and a handlebar stem 12 having a compression connector 14 formed on one distal end thereof and mounted around an outer wall of the steerer tube 10.

The handlebar stem coupling module comprises an urging sleeve 20 securely mounted between the outer wall of the steerer tube 10 and an inner wall of the compression connector 14, and an elongated slit 22 laterally defined in the urging sleeve 20 and extending along an entire length thereof. Preferably, the urging sleeve 20 has an outer diameter greater than an inner diameter of the compression connector 14.

Figure 3:
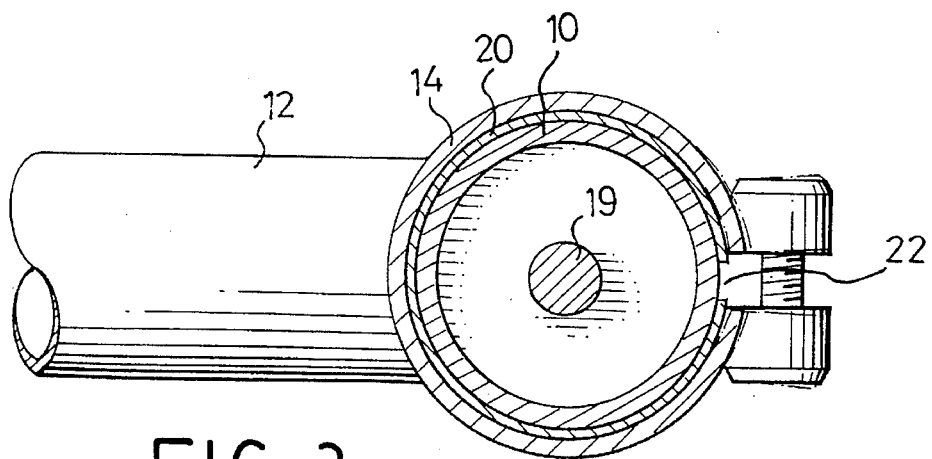
FIG. 3 is a top plan cross-sectional view of FIG. 1.

In assembly, referring to FIGS. 1-3, the urging sleeve 20 is initially mounted around the steerer tube 10. Then, a cap 18 is mounted on an upper portion of the steerer tube 10 and the urging sleeve 20. A positioning bolt 19 extends through a counterbore 182 defined in the cap 18 and is threadedly engaged in a threaded hole 102 defined in the steerer tube 10, thereby retaining the urging sleeve 20 together with the steerer tube 10 in position. Finally, the compression connector 14 is securely mounted around the urging sleeve 20.

It is to be noted that the urging sleeve 20 is slightly pressed radially and inwardly with the slit 22 being reduced such that the compression connector 14 can be mounted on the urging sleeve 20. In the meantime, the urging sleeve 20 can exert a tensile force on the compression connector 14 due to returning action. It is to be noted that the compression connector 14 has a plurality of lugs [not numbered] through which urging means such as bolts extend to clamp the handlebar stem coupling to the steerer tube 10, as is well-known and not described in further detail here.

By such an arrangement, the compression connector 14 can slide on the urging sleeve 20 when being released such that the level of the handlebar stem 12 can be adjusted freely. Preferably, a plurality of graduations 24 are formed on an outer wall of the urging sleeve 20 for indicating a total value of the height being adjusted.

Figure 4:
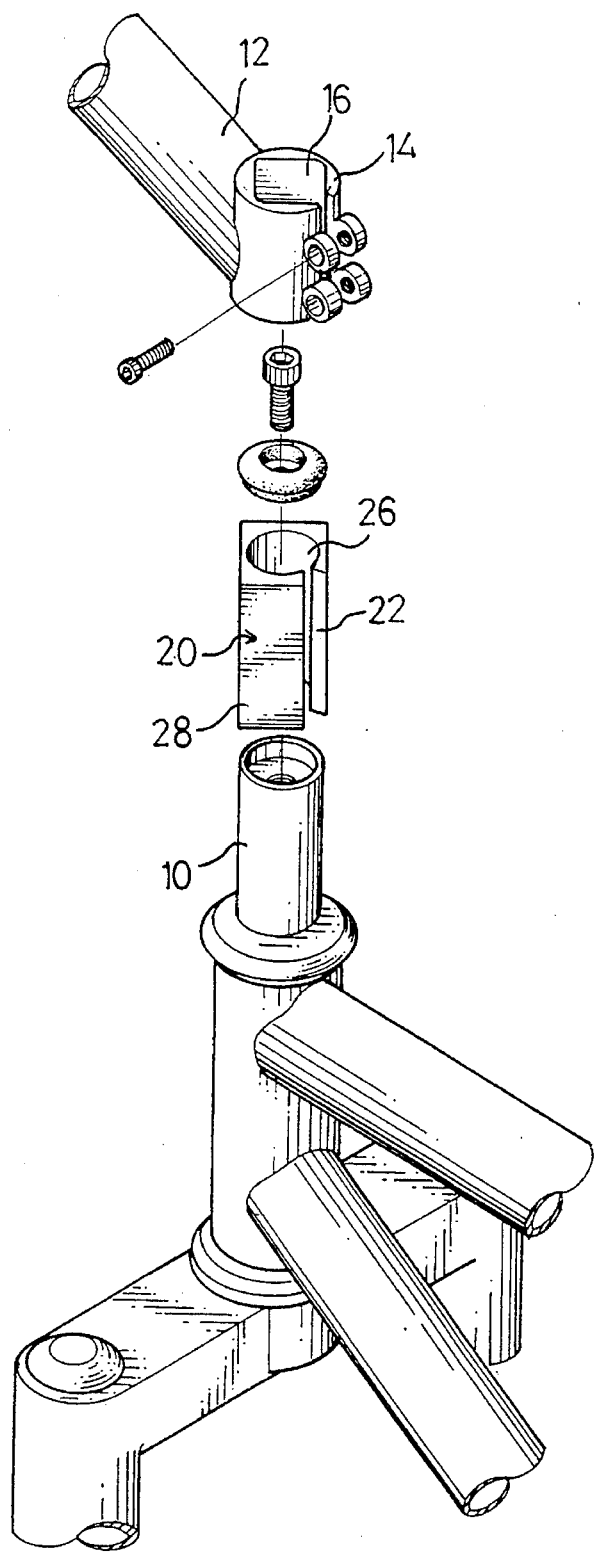
FIG. 4 is a perspective exploded view showing a coupling module in accordance with a second embodiment of the present invention.

Referring to FIG. 4, in accordance with a second embodiment of the present invention, the compression connector 14 has a polygonal passage 16 longitudinally defined through the inner wall thereof. The urging sleeve 20 has a corresponding polygonal outer wall 28 received in the polygonal passage 16, and a circular hole 26 is vertically defined through an inner wall of the urging sleeve 20 for receiving the steerer tube 10 therein.

It should be clear to those skilled in the art that further embodiments of the present invention may be made without departing from the teachings of the present invention.

I claim:

1. A handlebar stem coupling module for a bicycle comprising a steerer tube, a handlebar stem having a compression connector formed on one distal end thereof and mounted around an outer wall of said steerer tube, a polygonal passage longitudinally defined through an inner wall of said compression connector, an urging sleeve securely mounted between the outer wall of said steerer tube and the inner wall of said compression connector, a polygonal outer wall formed on said urging sleeve and received in said polygonal passage of said compression connector, a plurality of graduations formed on said polygonal outer wall of said urging sleeve, a circular hole vertically defined through an inner wall of said urging sleeve for receiving said steerer tube therein, and an elongated slit laterally and vertically defined in said urging sleeve and extending along a length thereof and communicating with said circular hole.

2. The handlebar stem coupling module in accordance with claim 1, wherein said urging sleeve has an outer diameter greater than an inner diameter of said compression connector.

* * * * *